United States Patent
Kong et al.

(10) Patent No.: US 11,135,953 B2
(45) Date of Patent: Oct. 5, 2021

(54) SEAT BACK FRAME FOR VEHICLE

(71) Applicants: Hyundai Motor Company, Seoul (KR); Kia Motors Corporation, Seoul (KR); HYUNDAI TRANSYS INC., Seosan-si (KR)

(72) Inventors: Ju Yeol Kong, Gyeonggi-do (KR); Gil Ju Kim, Seoul (KR); Jung Sang You, Gyeonggi-do (KR); Ju Hyun Cha, Seoul (KR); Tae Hee Won, Gyeonggi-do (KR); Seon Chae Na, Gyeonggi-do (KR); Chan Ho Jung, Gyeonggi-do (KR); Jin Ho Seo, Gyeonggi-do (KR); Sung Young Lee, Gyeonggi-do (KR); Man Seock Kim, Gyeonggi-do (KR); Joo Ho Park, Gyeonggi-do (KR); Dong Jin Kim, Gyeonggi-do (KR)

(73) Assignees: Hyundai Motor Company, Seoul (KR); Kia Motors Corporation, Seoul (KR); Hyundai Transys Inc., Seosan-si (KR)

( * ) Notice: Subject to any disclaimer, the term of this patent is extended or adjusted under 35 U.S.C. 154(b) by 0 days.

(21) Appl. No.: 16/688,630

(22) Filed: Nov. 19, 2019

(65) Prior Publication Data
US 2020/0406799 A1 Dec. 31, 2020

(30) Foreign Application Priority Data
Jun. 28, 2019 (KR) ........................ 10-2019-0077698

(51) Int. Cl.
*B60N 2/68* (2006.01)

(52) U.S. Cl.
CPC .................................. *B60N 2/682* (2013.01)

(58) Field of Classification Search
CPC .......... B60N 2/682; B60N 2/686; B60N 2/90; B60N 2/643
USPC ......................................... 297/452.18, 452.2
See application file for complete search history.

(56) References Cited

U.S. PATENT DOCUMENTS

| | | | |
|---|---|---|---|
| 6,378,946 B1 * | 4/2002 | Cope ........................ | B60N 2/68 297/452.2 |
| 8,714,653 B2 * | 5/2014 | Yamada ................... | B60N 2/68 297/452.2 |
| 9,315,135 B2 * | 4/2016 | Kitou ..................... | B60N 2/809 |

* cited by examiner

*Primary Examiner* — Milton Nelson, Jr.
(74) *Attorney, Agent, or Firm* — Mintz Levin Cohn Ferris Glovsky and Popeo, P.C.; Peter F. Corless (57) ABSTRACT

A seatback frame for a vehicle is capable of preventing a passenger seated on a seat from being injured by a sharp edge of a side frame in the event of a collision of the vehicle. The seatback frame includes side frames installed to extend longitudinally in a vertical direction at opposite sides of the seatback frame, respectively, an upper frame joined to the side frames, and a lower frame joined to the side frames. Protrusions are formed at a surface of the upper frame while being spaced apart, by a predetermined distance, from edges present at edge portions of the side frames, respectively, to prevent the passenger from being injured by the edges.

12 Claims, 8 Drawing Sheets

Cross-sectional view taken along line A - A

Cross-sectional view taken along line B - B

Cross-sectional view taken along line C – C

Cross-sectional view taken along line C - C

SEAT BACK FRAME FOR VEHICLE

CROSS-REFERENCE TO RELATED APPLICATION

This application claims under 35 U.S.C. § 119(a) the benefit of Korean Patent Application No. 10-2019-0077698 filed on Jun. 28, 2019, the entire contents of which are incorporated herein by reference.

BACKGROUND

(a) Technical Field

The present disclosure relates to a seatback frame for a vehicle, more particularly, to the seatback frame configured to prevent a passenger seated on a seat from being injured by a sharp edge of a side frame in the event of a collision of the vehicle.

(b) Description of the Related Art

Generally, seats of a vehicle include a seat cushion to support the lower body of a passenger seated on a seat, a seatback to support the upper body of the passenger, and a headrest installed at an upper end of the seatback to support the head and neck of the passenger.

The seatback may include a seatback frame connected to the seat cushion, the seatback frame configured to maintain the shape of the seatback, and a seatback cushion assembled to enclose a front surface of the seatback frame.

In addition, the seatback may further include a backboard, which is a plate-shaped member installed to cover a rear surface of the seatback frame. The backboard is assembled to a seat, typically to driver and passenger seats of large-size sedans.

Recently, additional features have been added to seats, particularly in luxury vehicles. For example, a power headrest can adjust positions of a headrest in an upward/downward direction and a forward/rearward direction in a motor-driven manner, and a motor-driven device can adjust an angle of a seatback or the like. Other features include a bolster adjuster, a seat heater, a seat air conditioner, a multimedia device for seats, etc.

Figure 1:
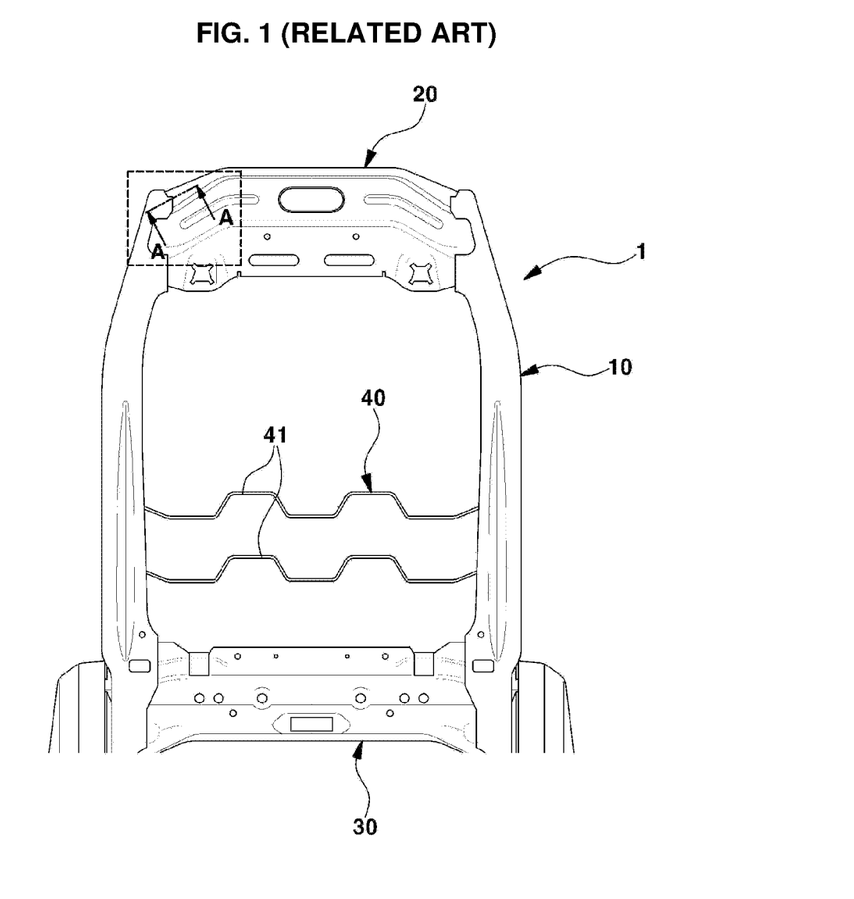
FIG. 1 (RELATED ART) is a view showing an assembled state of a conventional seatback frame.

FIG. 1 (RELATED ART) is a view showing an assembled state of a conventional seatback frame. As shown in FIG. 1, the seatback frame, which is designated by reference numeral "1", may have a rectangular frame structure vertically elongated when viewed at the front side.

In particular, the seatback frame 1 may include side frames 10 installed to extend longitudinally in a vertical direction while forming opposite side portions of the seatback frame 1, respectively, an upper frame 20 installed to connect upper ends of the opposite side frames 10 while forming an upper end portion of the side frame 10, and a lower frame 30 installed to connect lower ends of the opposite side frames 10 while forming a lower end portion of the side frame 10.

As shown in FIG. 1, the side frames 10, the upper frame 20 and the lower frame 30 may be assembled to form a rectangular frame structure in order to constitute the seatback frame 1. In this case, a suspension wire assembly 40 may be installed within the rectangular frame structure.

In FIG. 1, only a portion of the suspension wire assembly 40 is shown. Known suspension wire assemblies include a pair of vertical wires (not shown), and a plurality of horizontal wires 41 installed to connect the vertical wires.

FIG. 1 shows only a part of the horizontal wires 41 among the constituent elements of the suspension wire assembly 40.

Figure 2:
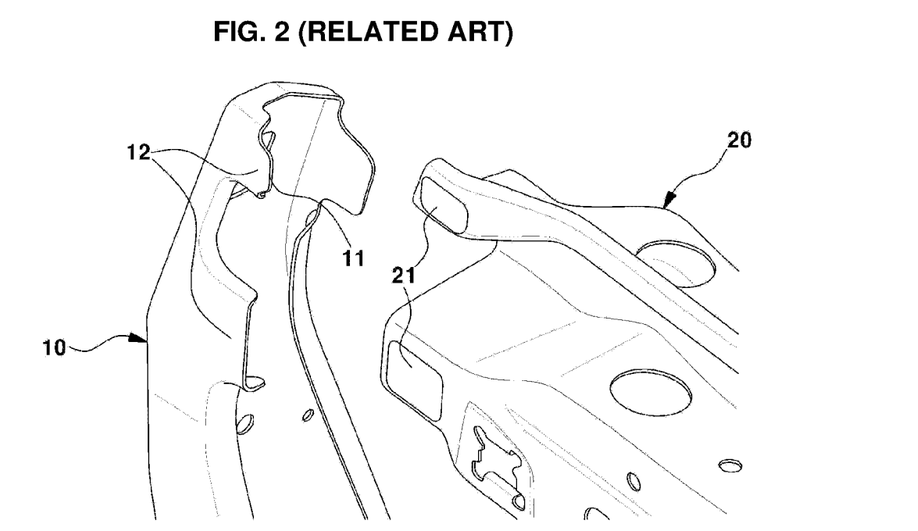
FIG. 2 (RELATED ART) is a perspective view showing a state of the conventional seatback frame before side frames and an upper frame are joined.
Figure 3:
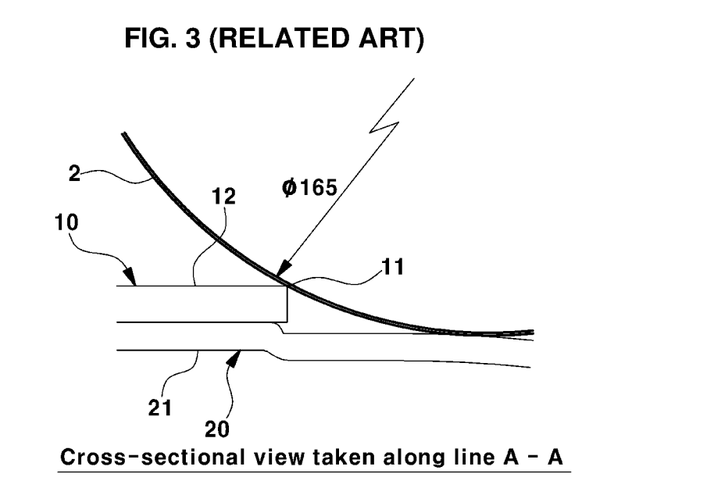
FIG. 3 (RELATED ART) is a sectional view showing a state of the conventional seatback frame in which the side frames and the upper frame are joined.

FIG. 2 (RELATED ART) is a perspective view showing a state of the conventional seatback frame before the side frames and the upper frame are joined. FIG. 3 (RELATED ART) is a sectional view showing a state of the conventional seatback frame in which the side frames and the upper frame are joined.

FIG. 2 is an enlarged view of an inner portion of a rectangular box indicated by a dotted line in FIG. 1. FIG. 3 shows a cross-section taken along line A-A in the inner portion of the rectangular box indicated by the dotted line in FIG. 1.

As shown in FIGS. 1-3, each of the side frames 10 and the upper frame 20 is constituted by a metal panel having a certain thickness. When desired portions of the side frames 10 constituted by panels are joined to desired portions of the upper frame 20 constituted by a panel, respectively, a structure of FIG. 3 is formed.

Referring to FIG. 2, it may be seen that cut surfaces are disposed along edges of joints 12 where the side frames 10 are joined to the upper frame 20, and there are sharp edges 11 at the cut surfaces.

When the sharp edges 11 are present to extend along edge portions of the joints 12 of the side frame 10 joined to the upper frame 20, as shown in FIG. 2, the upper body or head of the passenger seated on the seat may come into contact with the sharp edges 11 in the event of an accident such as a collision of the vehicle, and as such, the passenger may be injured.

To this end, regulations to prevent injury of passengers in association with sharp edges may be applicable. For example, in accordance with current laws/regulations, a sphere 2 having a diameter Φ of 165 mm should not contact the sharp edge 11 of the cut surface in each joint 12.

However, it is difficult to prevent the sphere 2 having the diameter Φ of 165 mm from contacting the sharp edge 11 of the cut surface in each joint 12, taking into consideration a typical side frame thickness and the shapes of joints 12 and 21 of the frames 10 and 20, as shown in FIG. 3.

It may be difficult to satisfy current laws/regulations only through variation in joint shapes, thicknesses and structures of the frames 10 and 20. In order to solve such problems, there has been a proposal in which the joints 12 and 21 are covered by separate covers 12, respectively, to cover the sharp edges of the cut surfaces of the side frames 10.

Figure 4:
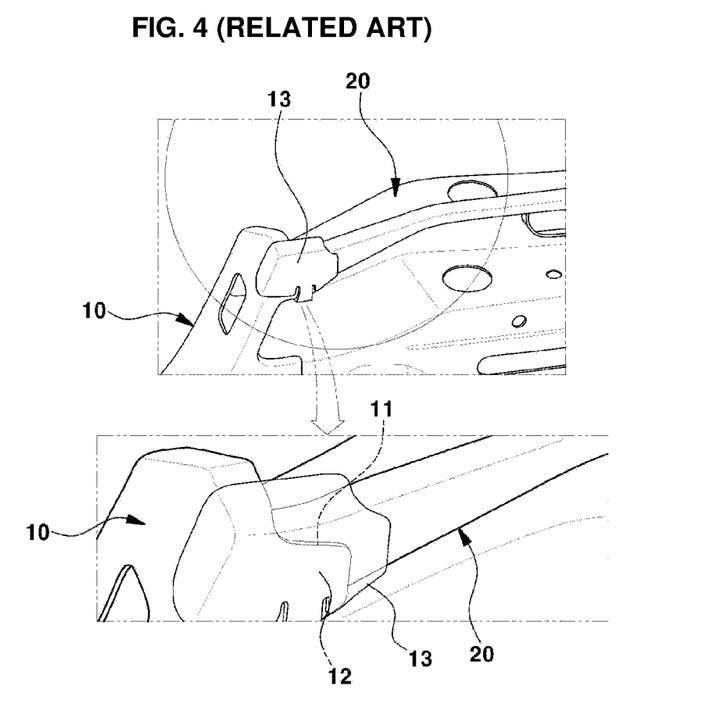
FIGS. 4 and 5 (RELATED ART) are views showing a state in which covers are attached to joints of the side and upper frames in the conventional seatback frame.
Figure 5:
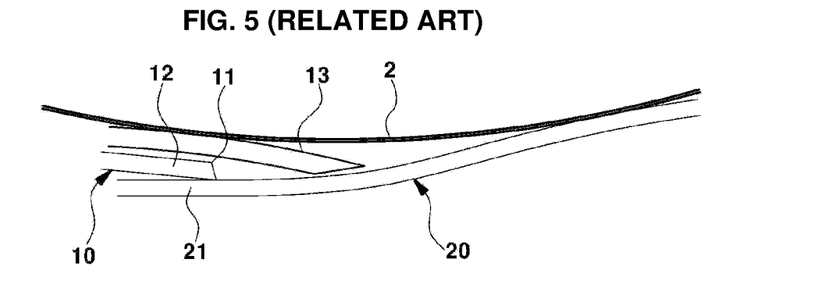

FIGS. 4 and 5 (RELATED ART) show a state in which covers are attached to the joints 12 and 21 of the side and upper frames 10 and 20 in the conventional seatback frame.

As shown in FIGS. 4 and 5, injection-molded covers 13 may be attached to cover the joints 12 and 21 of the frames 10 and 20, respectively. In an attached state, the covers 13 may cover the sharp edges 11 of the side frames 10. In this state, the sphere 2 having the diameter of 165 mm cannot contact the sharp edges 11 of the cut surfaces, and as such, current laws/regulations may be satisfied.

However, it is necessary to manufacture separate covers, that is, the covers 13, and to install the covers 13 at the frames 10 and 20 in a fixed state. For this reason, there are problems of an increase in costs and an increase in the number of assembly processes.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure relates to a seatback frame for a vehicle capable of preventing a passenger seated on a seat from being injured by a sharp edge of a side frame in the event of a collision of the vehicle.

In one aspect, the present disclosure provides a seatback frame for a vehicle including side frames installed to extend longitudinally in a vertical direction at opposite sides the seatback frame, respectively, an upper frame joined to the side frames, and a lower frame joined to the side frames, wherein protrusions are formed at a surface of the upper frame while being spaced apart, by a predetermined distance, from edges present at edge portions of the side frames, respectively, to prevent a passenger from being injured by the edges.

In a preferred embodiment, the edges may be present at edge portions of joints where the side frames are joined to the upper frame, respectively.

In another preferred embodiment, the protrusions may be formed at opposite ends of the upper frame, respectively, such that the protrusions extend forwards from a front surface of the upper frame when viewed in forward and rearward directions of seats.

In still another preferred embodiment, the protrusions may be formed at surfaces of opposite lateral ends of the upper frame to connect upper ends of the side frames, respectively.

In yet another preferred embodiment, positions of the protrusions at the upper frame may be determined to be positions where a sphere having a predetermined diameter does not come into contact with the edges, respectively, under a condition that the sphere simultaneously contacts random portions of surfaces of the side frames and the protrusions.

In still yet another preferred embodiment, the sphere may have a diameter of 165 mm or less.

In still yet another preferred embodiment, each of the protrusions may have an upper surface portion with a flat or convex surface.

In still yet another preferred embodiment, each of the protrusions may have a peripheral portion inclined upwardly from the surface of the upper frame to the upper surface portion of the protrusion, and the peripheral portion may have a curved part joining the upper surface portion of the protrusion while having a predetermined radius of curvature when viewed in cross-section.

In still yet another preferred embodiment, the convex surface of the upper surface portion in the protrusion may have a radius of curvature greater than the radius of curvature of the curved part joining the upper surface portion of the protrusion.

In still yet another preferred embodiment, the protrusion may satisfy a relation among factors m, h, and d expressed by the following expression:

$$(d+m) = \sqrt{\left(\frac{\Phi}{2} - h\right) \times h}$$

where, "m" represents a distance between the edge and a point, at which a sphere having a predetermined diameter contacts a random portion of a surface of a corresponding one of the side frames when the sphere simultaneously contacts the random portion of the surface of the corresponding side frame and the protrusion, "Φ" represents the predetermined diameter of the sphere, "h" represents a vertical distance from the surface of the upper frame to the upper surface portion of the protrusion, "d" represents a horizontal distance from the edge to an end point of the radius of curvature of the curved part, and the end point is a point on a boundary between the curved part and the upper surface portion in the protrusion.

In still yet another preferred embodiment, the protrusion at the upper frame may be positioned where the sphere does not come into contact with the edge of the corresponding side frame under a condition that the sphere simultaneously contacts the random portion of the surface of the corresponding side frame and the protrusion.

In still yet another preferred embodiment, the sphere may have a diameter of 165 mm or less.

In still yet another preferred embodiment, each of the side frames may have a thickness of 0.5 to 2 mm.

Other aspects and preferred embodiments of the disclosure are discussed infra.

The present disclosure may provide the following effects in accordance with the illustrated embodiments, the above-described configurations, the combinations of the configurations, and use relations thereof.

In accordance with the seatback frame according to the present disclosure, certain laws/regulations stipulating that the sphere having the diameter Φ of 165 mm should not contact the sharp edge of the side frame may be satisfied. Accordingly, it may be possible to effectively prevent a passenger seated on a seat from being injured by the sharp edge of the side frame in the event of an accident such as a vehicle collision.

In addition, in the seatback frame according to the present disclosure, it may be possible to eliminate an injection-molded cover installed after being separately manufactured in conventional cases in order to satisfy the above-described law. Further, an additional welding process for eliminating sharpness of sharp edges may be omitted.

Accordingly, a reduction in material costs may be achieved. Further, costs required for alternation of welding equipment for additional welding may be reduced. As such, a reduction in manufacturing costs and a reduction in the number of manufacturing processes may be achieved.

In addition, it is unnecessary to vary the shape of the seatback frame in order to eliminate sharp edges. In this regard, freedom of design of the seatback frame may be enhanced.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, preferred embodiments of the present disclosure will be described in detail with reference to the accompanying drawings, and as such, may be easily implemented by one of ordinary skill in the art to which the present disclosure pertains. The present disclosure may be embodied in many different forms and should not be construed as limited to the embodiments set forth herein.

The basic frame configuration of a seatback frame according to an embodiment of the present disclosure has no difference from those of conventional cases. Accordingly, FIG. 1, e.g., depicts the basic frame configuration of the seatback frame.

As illustrated in FIG. 1, the seatback frame according to the illustrated embodiment of the present disclosure, which is designated by reference numeral "1", may include side frames 10 installed to extend longitudinally in a vertical direction while forming opposite side portions of the seatback frame 1, respectively, an upper frame 20 installed to connect upper ends of the opposite side frames 10 while forming an upper end portion of the side frame 10, and a lower frame 30 installed to connect lower ends of the opposite side frames 10 while forming a lower end portion of the side frame 10.

In this case, the side frames 10, the upper frame 20 and the lower frame 30 may be assembled to form a rectangular frame structure in order to constitute the seatback frame 1. In this case, a suspension wire assembly 40 may be installed within the rectangular frame structure.

Figure 6:
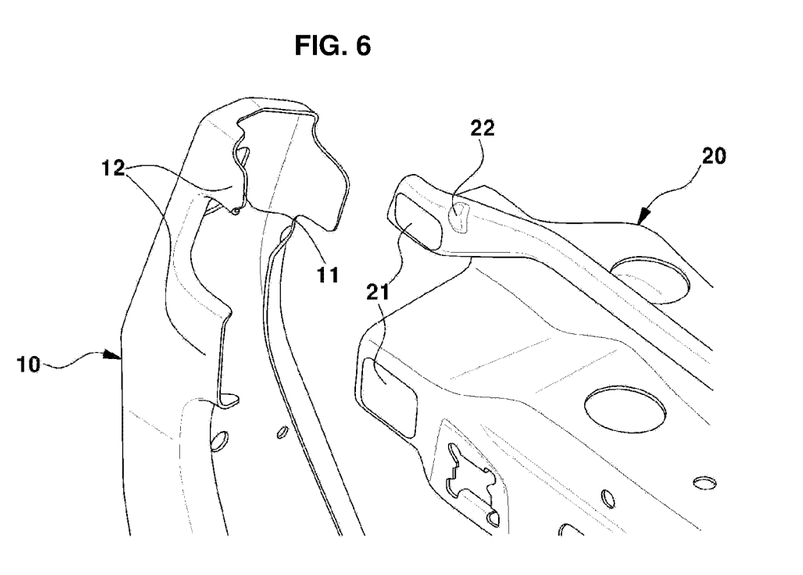
FIG. 6 is a perspective view illustrating a state of a seatback frame according to an embodiment of the present disclosure before side frames and an upper frame are joined.

FIG. 6 is a perspective view illustrating a state of the seatback frame 1 according to the illustrated embodiment of the present disclosure before the side frames 10 and the upper frame 20 are joined. In FIG. 6, the side frames 10 and the upper frame 20 constituting the seatback frame 1 are illustrated as being in a separate state before assembly.

As illustrated in FIG. 6, the upper frame 20 is provided, at opposite lateral ends thereof, with joints 21 to be joined to the side frames 10, respectively. In this case, the joints 21 may be provided at upper and lower portions of each end of the upper frame 20, to be joined to each side frame 10, respectively. Meanwhile, each side frame 10 is provided, at opposite longitudinal ends thereof, with joints 12 to be joined to corresponding ones of the joints 21 of the upper frame 20, respectively.

Each joint 21 of the upper frame 20 may be joined to an inner surface of the corresponding joint 12 of the corresponding side frame 10 through welding, and as such, coupling of the side frames 10 and the upper frame 20 may be achieved.

Meanwhile, in the seatback frame 1 according to the illustrated embodiment of the present disclosure, protrusions 22 are formed at surfaces of the opposite ends of the upper frame 10, respectively. Each protrusion 22 may be formed to be spaced apart, by a predetermined distance, from a corresponding one of the joints 21 provided at the upper portion of the upper end of the upper frame 20.

In addition, the protrusions 22 may be formed to have a convex shape on the surfaces of the opposite ends of the upper frame 10, respectively. In particular, each protrusion 22 may be formed to protrude in a forward direction from a front portion of the corresponding end surface of the upper frame 10 when viewed in forward and rearward directions of the seat.

Accordingly, when viewing the entirety of the seatback frame 1, each protrusion 22 is viewed as being disposed at a front surface of the upper end of the seatback frame 1.

Figure 7:
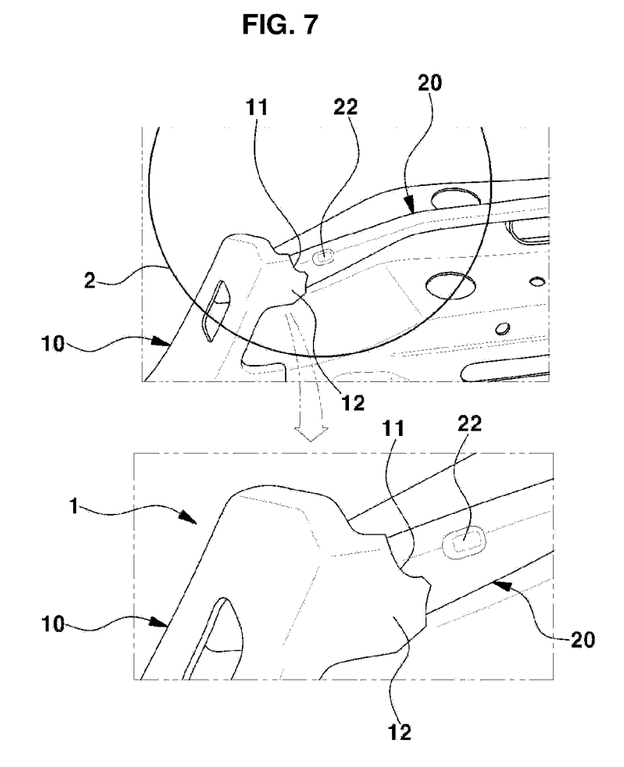
FIGS. 7 and 8 are perspective views illustrating a coupled state of the side frames and the upper frame in the seatback frame according to the illustrated embodiment of the present disclosure.
Figure 8:
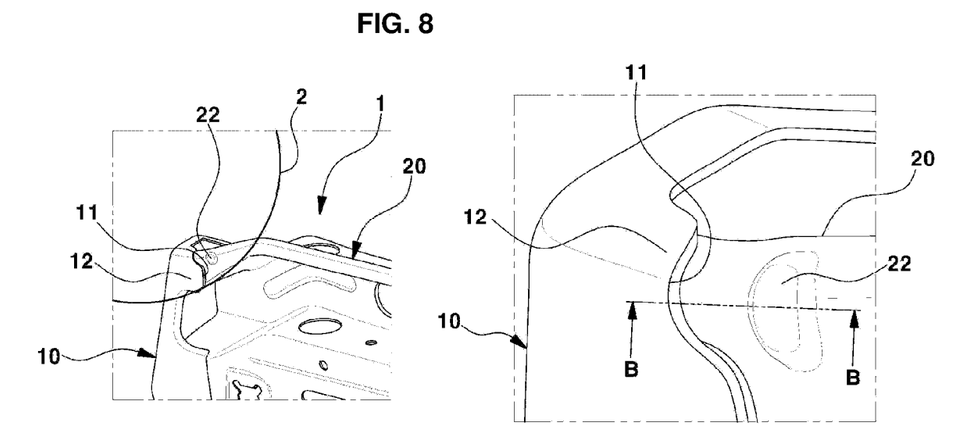

FIGS. 7 and 8 are perspective views illustrating a coupled state of the side frames and the upper frame in the seatback frame according to the illustrated embodiment of the present disclosure. FIGS. 7 and 8 are perspective views taken at different viewing angles, respectively.

Figure 9:
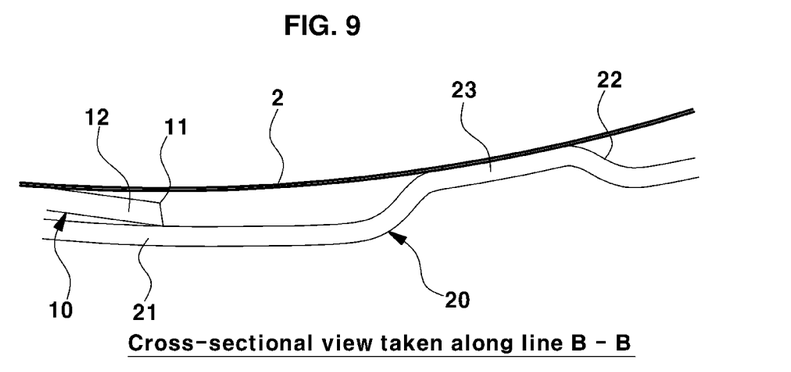
FIG. 9 is a cross-sectional view taken along line B-B in FIG. 8.

FIG. 9 is a cross-sectional view taken along line B-B in FIG. 8. In FIG. 9, a sphere 2 having a diameter Φ of 165 mm is also illustrated.

In the present disclosure, the diameter Φ of the sphere is an example of a sphere stipulated by current laws/regulations. In the following description of the present disclosure, however, the diameter Φ of the sphere may be 165 mm or less.

As illustrated in FIG. 9, in an assembled state of the seatback frame 1, each protrusion 22 formed at the upper frame 20 to have a protruding structure is disposed near the sharp edge 11 of the corresponding side frame 10. In this case, the protrusion 22 of the upper frame 20 is spaced apart from the sharp edge 11 of the side frame 10 by a predetermined distance.

In the seatback frame according to the illustrated embodiment of the present disclosure, the opposite lateral ends of the upper frame 20 are joined to the upper ends of the side frames 10 disposed at left and right sides, respectively. In the following description, joining portions of the frames 10 and 20 and portions of the frames 10 and 20 disposed around the joining portions will be collectively referred to as "joints".

Upon coupling the frames 10 and 20, the joints 21 of the upper frame 20 are inserted into the corresponding joints 12 of the side frames 10 such that the inner surfaces of the joints 12 of the side frames 10 come into contact with the outer surfaces of the corresponding joints 21 of the upper frame 20, respectively. In this state, welding is performed to join corresponding ones of the joints 12 and 21.

As illustrated in FIG. 7 and an enlarged right view in FIG. 8, the edge of each joint 12 in each side frame 10 has the form of a cut surface, and a sharp edge 11 is present at the cut surface.

As illustrated in FIGS. 7-8, in a state in which each end of the upper frame 20 is joined to the upper end of the corresponding side frame 10, the protrusion 22 formed at the end of the upper frame 20 is disposed at a position spaced apart, by a predetermined distance, from the cut edge surface of the side frame 10, that is, the cut surface of the side frame 10 and the sharp edge 11 of the cut surface.

In addition, the protrusion 22 is formed at the surface of the end of the upper frame 20, to which the side frame 10 is joined, such that the protrusion 22 does not have a concave structure, but has a convex structure having a predetermined height. As illustrated in FIGS. 7 and 8, the protrusion 22 is disposed at the end surface of the upper frame 20 beside the cut surface of the side frame 10 and the sharp edge 11.

Accordingly, as can be seen from FIG. 7, a left view in FIG. 8, and FIG. 9, the sphere 2 having the diameter Φ of 165 mm not only contacts a particular portion of the outer surface of the side frame 10, but also contacts the upper surface of the protrusion 22. In this state, the surface of the sphere 2 may be spaced apart from the sharp edge 11 of the cut surface of the side frame 10 without contacting the sharp edge 11.

Each protrusion 22 formed at the upper frame 20 may be positioned where a sphere having a predetermined diameter, that is, the sphere having the diameter of 165 mm, does not come into contact with the edge of the corresponding side frame 10 under the condition that the sphere simultaneously contacts a random portion of the surface of the side frame 10 and the protrusion 22.

As the surface of the sphere 2 does not contact the sharp edge 11 of the side frame 10, current laws/regulations may be satisfied. In particular, in the present disclosure, it may be possible to satisfy current laws/regulations by simply forming the protrusion 22 without manufacture, installation and use of a cover as in conventional cases.

Assuming that the head of a passenger seated on a seat is the above-described sphere, the head of the passenger comes into contact with upper surface portions 23 of the protrusions 22 each having a flat or convex surface without coming into contact with the sharp edges 11 of the side frames 10 in the event of an accident such as a vehicle collision, and as such, the head of the passenger may be supported by the upper surface portions 23 of the protrusions 22. Accordingly, it may be possible to prevent the head of the passenger from being injured by the sharp edges 11.

In addition, there may be advantages of a reduction in costs and a reduction in the number of assembly processes because it may be possible to eliminate use of a cover as in conventional cases while preventing injury caused by the sharp edges 11, as described above.

In an embodiment of the present disclosure, the upper surface portion 23 of each protrusion 22 is preferably formed to have a wide and flat shape, as illustrated in FIG. 9.

Figure 10:
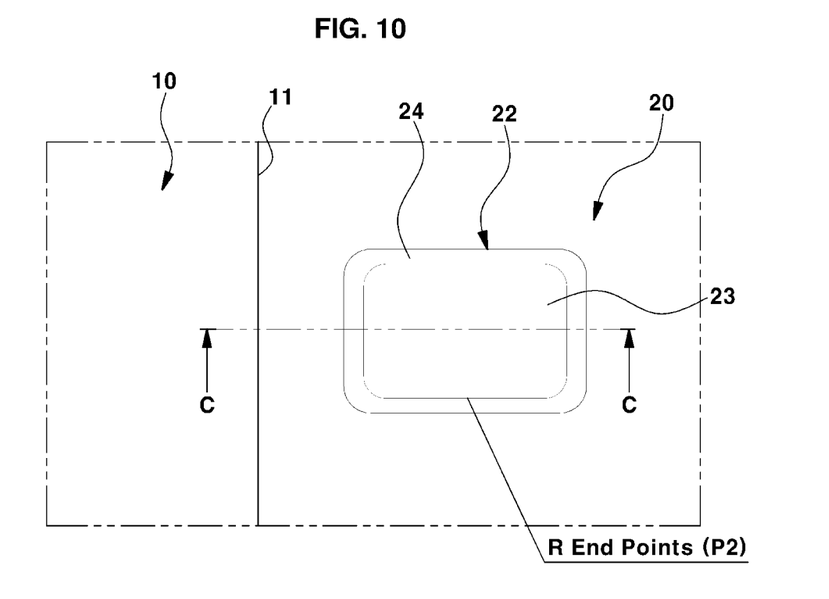
FIGS. 10 and 11 are views explaining a method for determining the position and height of each protrusion in accordance with an embodiment of the present disclosure.
Figure 11:
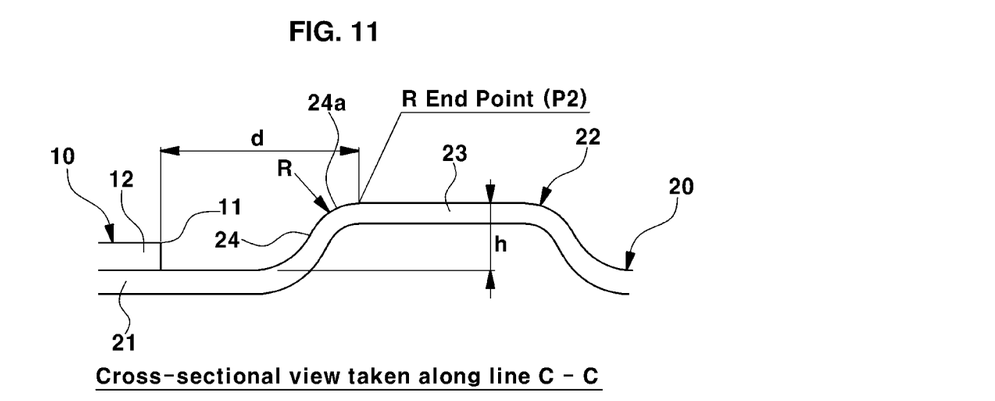

FIGS. 10 and 11 are views explaining a method for determining the position and height of each protrusion in accordance with an embodiment of the present disclosure. FIG. 10 is a plan view, and FIG. 11 is a cross-sectional view taken along line C-C in FIG. 10.

In the present disclosure, the thickness of each slide frame 10 may be 0.5 to 2 mm.

In the following description, the protrusion position and height determining method may be applied to the case in which the thickness of each side frame 10 is assumed to be 0.5 to 2 mm Although the position and height of each protrusion 22 are determined with reference to the case in which the thickness of each side frame 10 is 0.5 to 2 mm, the thickness of 0.5 to 2 mm is only an example of a desirable thickness of each side frame 10, and the thickness of each side frame 10 is not limited to the thickness of 0.5 to 2 mm. The thickness of each side frame 10 may be diversely varied and modified.

In order to prevent the sharp edge 11 of each side frame 10 from coming into contact with the sphere 2, the position and height of each protrusion 22 in the upper frame 20 may be determined as follows.

First, in FIG. 11, the height of the protrusion 22, h, is defined by a vertical distance from an upper surface of the upper frame 20 to the upper surface portion 23 of the protrusion 22.

Figure 12:
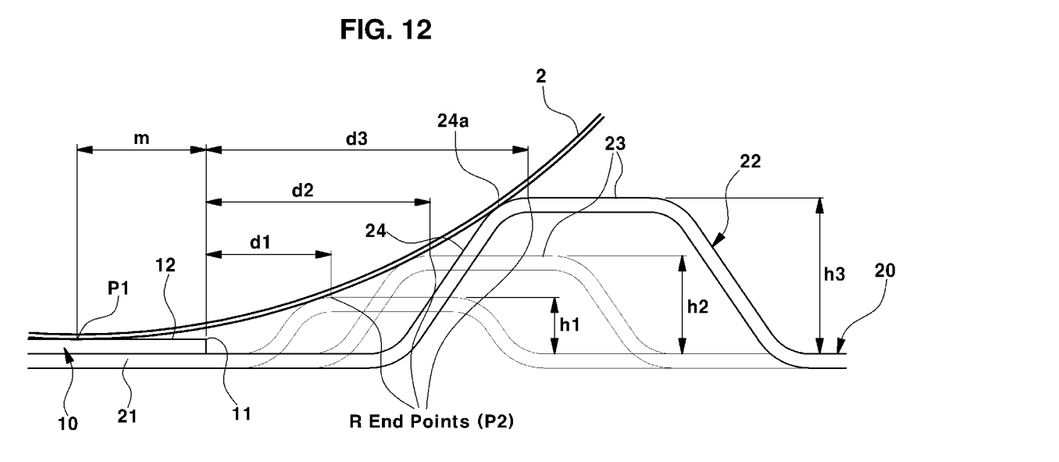
FIG. 12 is a view illustrating several examples of protrusions having different heights and different positions in the seatback frame according to various examples of the present disclosure

In addition, assuming that the protrusion 22 has a peripheral portion 24 inclined upwardly from the upper surface of the upper frame 20, as illustrated in FIGS. 10 to 12, the radius of curvature, R, of a cross-sectional structure as illustrated in FIG. 11 means the radius of curvature of the cross-section in the inclined peripheral portion 24 of the protrusion 22, in particular, a curved part 24a thereof joining the upper surface portion 23 of the protrusion 22.

The portion designated by reference numeral "24a" in FIG. 11 is referred to as the "curved part" in the above description because the part 24a has a curved cross-section. In practice, however, a part of the peripheral portion 24 in each protrusion 22, which has the radius of curvature R while joining the upper surface portion 23, is the curved part as described above.

In addition, as can be seen from FIG. 10, the upper surface portion 23 of each protrusion has a wide and flat surface. In this case, the structure of the upper surface portion 23 of the protrusion 22 may be a structure having curved corners while having a rectangular shape throughout the entirety thereof.

Although the upper surface portion 23 of the protrusion 22 is illustrated in FIG. 10 as having a rectangular shape throughout the entirety thereof, this shape is only illustrative, and the present disclosure is not limited thereto. The shape of the upper surface portion 23 of the protrusion 22 and the shape of the entirety of the protrusion 22 may be diversely varied and modified.

The line extending along the periphery of the upper surface portion 23 of the protrusion 22 as illustrated in FIG. 10 corresponds to the line extending along an inner end of the curved part 24a having the radius of curvature R. These lines correspond to a line connecting end points P2 of the radius of curvature R of the curved part 24a disposed along the periphery of the upper surface portion 23, as illustrated in FIG. 11. The end points P2 are points on a boundary between the curved part 24a and the upper surface portion 23 in the protrusion 22. The end points P2 are points where the curved part 24a of the protrusion 22 ends, and the horizontal upper surface portion 23 of the protrusion 22 starts.

That is, referring to FIG. 11, the end point P2 in the cross-section of the protrusion 22 is a pointer where the curved part 24a of the protrusion 22 ends. That is, the end point P2 is a point where the curved part of the cross-section ends such that the curvature of the cross-section disappears, and the protrusion 22 becomes flat such that the horizontal upper surface portion 23 starts.

Meanwhile, referring to FIG. 11, a horizontal distance d between the sharp edge 11 of the side frame 10 and the end point of the curved part 24a having the radius of curvature R in the protrusion 22, that is, the end point P2 (FIG. 10), is indicated together with the height h of the protrusion 22. In FIG. 11, the radius of curvature of the curved part 24a in the protrusion 22 is also indicated.

FIG. 12 is a view illustrating several examples of protrusions having different heights h and different positions in the seatback frame according to various examples of the present disclosure. FIG. 12 illustrates a plurality of protrusions 22 having different shapes, in particular, a plurality of protrusions 22 having positions d (d1, d2 and d3) on the upper frame 20 and different heights h (h1, h2 and h3).

In FIG. 12, three protrusions 22 are illustrated. The three protrusions 22 have positions and heights h preventing the sphere 2 having the diameter Φ of 165 mm from coming into contact with the sharp edge 11 of the corresponding side frame 10.

Accordingly, when any of the three protrusions 22 is formed at the upper frame 20, the sphere 2 having the diameter Φ of 165 mm does not come into contact with the sharp edge 11 of the corresponding side frame 10, and as such, current laws/regulations may be satisfied.

In FIG. 12, the distance between the sharp edge 11 and a point P1, at which the sphere 2 having the diameter Φ of 165 mm comes into contact with a surface of the side frame 10 (an upper surface when viewed in FIG. 12) in the cross-section of the side frame 10 when the sphere 2 having the diameter Φ of 165 mm comes into contact with the upper surface of the side frame 10, is defined as "m".

That is, the distance between a point on the upper surface of the side frame 10 in the cross-section of the side frame 10 contacting the sphere 2, that is, a contact point P1, and the sharp edge 11 is "m".

Accordingly, the distance m between the contact point P1 of the side frame 10 and the sharp edge 11 of the side frame 10, the height h of the protrusion 22, and the distance d between the sharp edge 11 and the end point P2 of the radius of curvature R of the curved part 24a are factors to determine the height h and position of the protrusion 22 in the upper frame 20.

In other words, once the distance m is determined, the protrusion 22 of the upper frame 20 may have various shapes and sizes having different heights h and difference distances d. The height h of the protrusion 22 may be h1, h2 or h3 (h1<h2<h3). In this case, the distance d between the sharp edge 11 and the end point P2 may be d1, d2 or d3 (d1<d2<d3).

As described above, the protrusions 22 illustrated in FIG. 12 have different shapes. In detail, the protrusions 22 have different positions d (d1, d2 and d3) on the upper frame 20 and different heights h (h1, h2 and h3).

All of the three protrusions 22 illustrated in FIG. 12 have positions and heights preventing the sphere 2 having the diameter Φ of 165 mm from coming into contact with the sharp edge 11 of the side frame 10. Accordingly, when any of the three protrusions 22 is formed at the upper frame 20, current laws/regulations may be satisfied, and as such, it may be possible to prevent the passenger from being injured by the sharp edge in the event of a vehicle accident.

In a preferred embodiment of the present disclosure, the protrusion 22 having factors to determine the shape of the protrusion 22, that is, the factors m, h and d to determine the protrusion position on the upper frame 20 and the protrusion height, which satisfy the following Expression 1, may be formed at the upper frame 20.

$$(d+m) = \sqrt{\left(\frac{\Phi}{2} - h\right) \times h} \quad \text{Expression 1}$$

where, "Φ" represents the diameter of the sphere.

Expression 1 prescribes the relation among the factors m, h and d under current laws/regulations. When the protrusion 22, which has values of m, h and d satisfying the relation according to Expression 1, is formed at the upper frame 20, current laws/regulations prescribing prevention of the sphere 2 having the diameter Φ of 165 mm from contacting the sharp edge 11 of the side frame 10 may be satisfied.

This means that the head of the passenger seated on a seat is prevented from coming into contact with the sharp edge 11 of the side frame 10, and as such, is not injured by the sharp edge 11.

Figure 13:
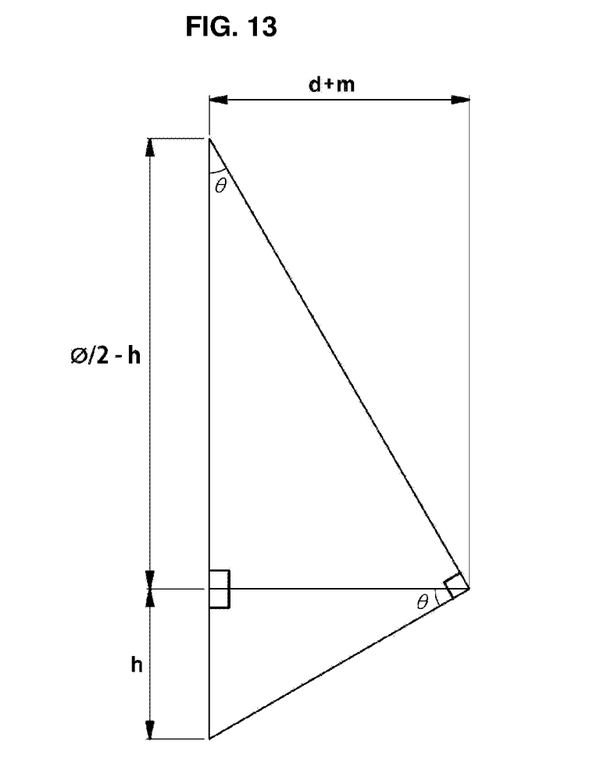
FIG. 13 is a view explaining derived from a geometric formula associated with a triangle for derivation of a relation among "m", "h" and "d" in the seatback frame according to the illustrated embodiment of the present disclosure.

Expression 1 is derived from a geometric formula associated with a triangle illustrated in FIG. 13. Here, the geometric formula is expressed by the following Expression 2.

$$\tan\theta = \frac{d+m}{\frac{\Phi}{2}-h} = \frac{h}{d+m} \qquad \text{Expression 2}$$

Since "$(d+m)^2$" is "$(\Phi/2-h) \times h$" in accordance with Expression 2 $((d+m)^2=(\Phi/2-h) \times h)$, Expression 1 may be derived from Expression 2.

Figure 14:
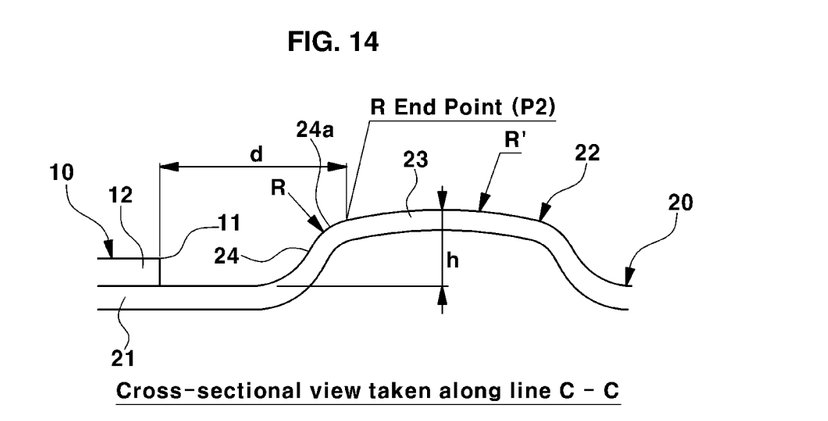
FIG. 14 is a sectional view illustrating the shape of a protrusion in a seatback frame according to another embodiment of the present disclosure.

Although the upper surface portion 23 of each protrusion 22 has a wide and flat surface in accordance with the illustrated embodiment of the present disclosure, as illustrated in FIG. 11, the upper surface portion 23 of the protrusion 22 may have a surface having an upwardly convex shape in accordance with another embodiment of the present disclosure, as illustrated in FIG. 14.

That is, the upper surface portion 23 of the protrusion 22 may include a convex surface having a curved shape with a certain radius of curvature R' when viewed in cross-section.

In this case, the radius of curvature R' of the convex surface may be determined to be greater than the radius of curvature R of the curved part 24a joining the upper surface portion 23 when viewed in cross-section (that is, "R<R'").

As such, in accordance with the seatback frame according to the present disclosure, the law stipulating that the sphere 2 having the diameter Φ of 165 mm should not contact the sharp edge of the side frame may be satisfied. Accordingly, it may be possible to effectively prevent the passenger seated on a seat from being injured by the sharp edge of the side frame in the event of an accident such as a vehicle collision.

In addition, in the seatback frame according to the present disclosure, it may be possible to eliminate an injection-molded cover installed after being separately manufactured in conventional cases in order to satisfy the above-described law. Further, an additional welding process for eliminating sharpness of sharp edges may be omitted.

Accordingly, a reduction in material costs may be achieved. Further, costs required for alternation of welding equipment for additional welding may be reduced. As such, a reduction in manufacturing costs and a reduction in the number of manufacturing processes may be achieved.

In addition, it is unnecessary to vary the shape of the seatback frame in order to eliminate sharp edges. In this regard, freedom of design of the seatback frame may be enhanced.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A seatback frame for a vehicle, comprising:
    side frames installed to extend longitudinally in a vertical direction at opposite sides of the seatback frame, respectively;
    an upper frame joined to the side frames; and
    a lower frame joined to the side frames,
    wherein protrusions are formed at a surface of the upper frame while being spaced apart, by a predetermined distance, from edges of the side frames, respectively, to prevent a passenger from being injured by the edges,
    wherein the edges are present at edge portions of joints where the side frames are joined to the upper frame, respectively, and
    wherein each of the protrusions has a peripheral portion inclined upwardly from the surface of the upper frame to an upper surface portion of the protrusion so as to prevent a sphere from contacting the edges of the side frames.

2. The seatback frame according to claim 1, wherein the sphere has a diameter of 165 mm or less.

3. The seatback frame according to claim 1, wherein the protrusions are formed at opposite ends of the upper frame, respectively, such that the protrusions extend forwards from a front surface of the upper frame when viewed in forward and rearward directions of seats.

4. The seatback frame according to claim 1, wherein the protrusions are formed at the surface of the upper frame at opposite lateral ends of the upper frame connecting upper ends of the side frames, respectively.

5. The seatback frame according to claim 1, wherein each of the protrusions has an upper surface portion with a flat or convex surface.

6. The seatback frame according to claim 5, wherein the peripheral portion has a curved part joining the upper surface portion of the protrusion while having a predetermined radius of curvature when viewed in cross-section.

7. The seatback frame according to claim 6, wherein the convex surface of the upper surface portion in the protrusion has a radius of curvature greater than the radius of curvature of the curved part joining the upper surface portion of the protrusion.

8. The seatback frame according to claim 6, wherein the protrusion satisfies a relation among factors m, h, and d expressed by an expression:
    where, "m" represents a distance between the edge and a point, at which a sphere having a predetermined diameter contacts a random portion of a surface of a corresponding one of the side frames when the sphere simultaneously contacts the random portion of the surface of the corresponding side frame and the protrusion;
    "Φ" represents the predetermined diameter of the sphere;
    "h" represents a vertical distance from the surface of the upper frame to the upper surface portion of the protrusion;
    "d" represents a horizontal distance from the edge to an end point of the radius of curvature of the curved part; and
    the end point is a point on a boundary between the curved part and the upper surface portion in the protrusion.

9. The seatback frame according to claim 8, wherein the sphere has a diameter of 165 mm or less.

10. The seatback frame according to claim 8, wherein each of the side frames has a thickness of 0.5 to 2 mm.

11. The seatback frame according to claim 8, wherein the protrusion at the upper frame is positioned where the sphere does not come into contact with the edge of the corresponding side frame under a condition that the sphere simultaneously contacts the random portion of the surface of the corresponding side frame and the protrusion.

12. A seatback frame for a vehicle, comprising:
side frames installed to extend longitudinally in a vertical direction at opposite sides of the seatback frame, respectively;
an upper frame joined to the side frames; and
a lower frame joined to the side frames,
wherein protrusions are formed at a surface of the upper frame while being spaced apart, by a predetermined distance, from edges of the side frames, respectively, to prevent a passenger from being injured by the edges, and
wherein each of the protrusions has a peripheral portion inclined upwardly from the surface of the upper frame to an upper surface portion of the protrusion, and the peripheral portion has a curved part joining the upper surface portion of the protrusion while having a predetermined radius of curvature when viewed in cross-section.

\* \* \* \* \*